United States Patent [19]

Dircksen

[11] 4,297,681

[45] Oct. 27, 1981

[54] ELECTROLUMINESCENT RING LIGHT ADAPTER FOR AIRCRAFT INSTRUMENTS

[76] Inventor: Arnold D. Dircksen, 2974 State Rte. 725, Spring Valley, Ohio 45370

[21] Appl. No.: 177,241

[22] Filed: Aug. 11, 1980

[51] Int. Cl.³ .............................................. G01D 11/28
[52] U.S. Cl. .................. 340/366 F; 362/23; 362/29
[58] Field of Search ............... 340/366 F; 362/23, 29, 362/30

[56] References Cited

U.S. PATENT DOCUMENTS

| | | | |
|---|---|---|---|
| 2,721,808 | 10/1955 | Roberts | 313/486 |
| 3,027,668 | 4/1962 | Hardesty | 362/23 |
| 3,875,449 | 4/1975 | Byler | 313/486 |
| 4,181,925 | 1/1980 | Burrows | 362/23 X |

*Primary Examiner*—Harold I. Pitts
*Attorney, Agent, or Firm*—Wigman & Cohen

[57] ABSTRACT

An electroluminescent (EL) ring lamp for illuminating dial indicia, pointers and the like of aircraft instruments is disclosed. The EL ring lamp comprises a flat split-ring arranged in a recess in an adapter plate removably mounted in front of the transparent instrument cover. The ring lamp is formed with microencapsulated phosphor particles applied in a polymeric binder to the illuminating surface of the lamp. In an alternate embodiment, the ring lamp has a frusto-conical illuminating surface.

9 Claims, 4 Drawing Figures

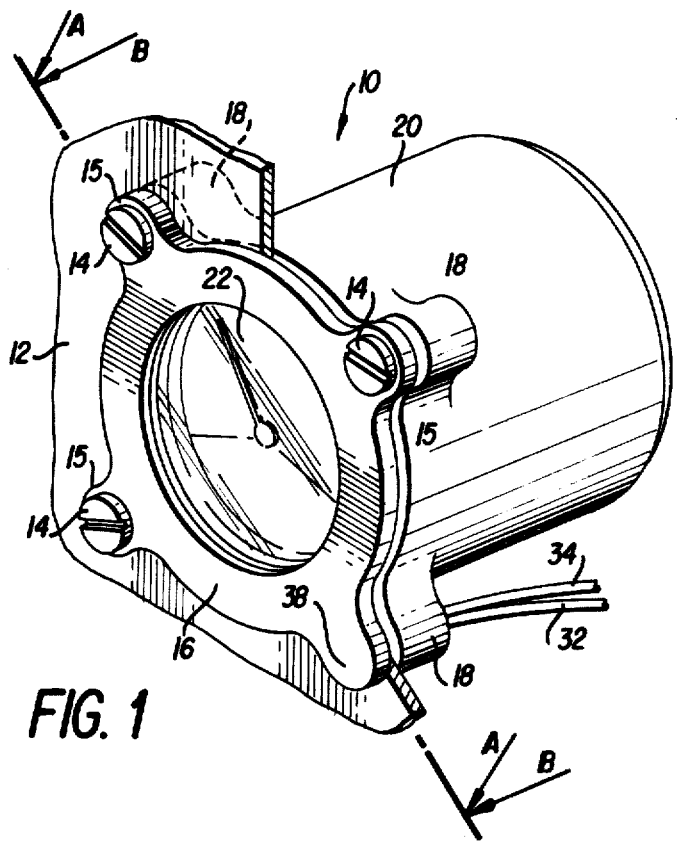
FIG. 1
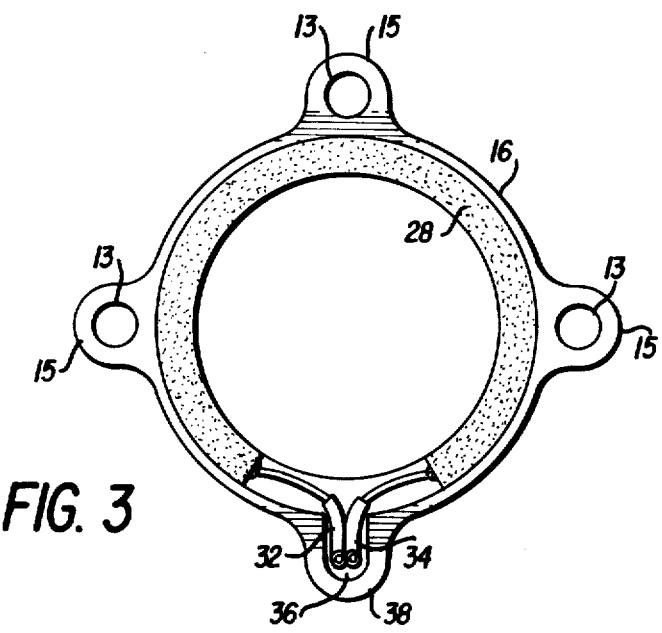
FIG. 3
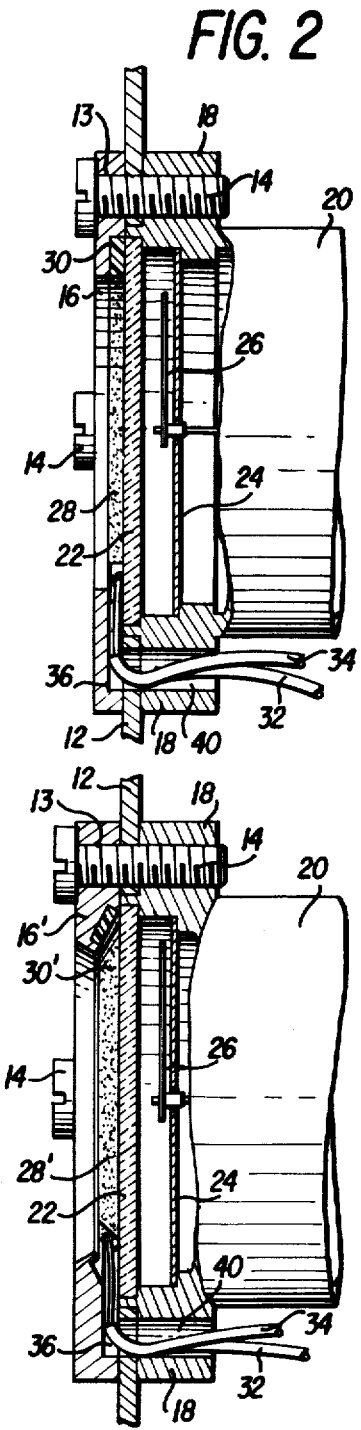
FIG. 2
FIG. 4

4,297,681

ELECTROLUMINESCENT RING LIGHT ADAPTER FOR AIRCRAFT INSTRUMENTS

BACKGROUND OF THE INVENTION

The present invention relates to improvements in aircraft instruments and, more particularly, to electroluminescent illumination devices for the direct lighting of aircraft instrument dials including alpha-numeric and symbolic indicia thereon, pointers and the like.

A search of the prior art failed to uncover any prior art references which disclose the improvements of the present invention. The following is a listing of the prior art patents uncovered during the search:

| U.S. Pat. No. | Patentee | Issue Year |
| --- | --- | --- |
| 2,140,972 | Rylsky | 1938 |
| 2,259,910 | Rylsky | 1941 |
| 3,027,668 | Hardesty | 1962 |
| 3,027,669 | Hardesty | 1962 |
| 3,068,833 | Hoffman | 1962 |
| 3,223,833 | Protzmann | 1965 |
| 3,701,900 | Thuler | 1972 |
| 3,867,623 | Widlund | 1975 |
| 4,138,620 | Dickson | 1979 |
| 4,144,557 | Kerr, III et al | 1979 |
| 4,181,925 | Burrows et al | 1980 |

From U.S. Pat. No. 4,181,925 to Burrows et al, it is known to illuminate aircraft instrument dials using an area of electroluminescent material arranged in a sealed, glass laminate instrument cover so that, when the electroluminescent material is energized, light is emitted to illuminate a selected portion of the instrument. According to Burrows et al, the electroluminescent material includes a layer of light emitting phosphor dispersed in a resin binder which overlies a tin oxide film applied to the glass laminate. The cover assembly is said to require minimum maintenance because it is a sealed assembly.

U.S. Pat. No. 4,138,620 to Dickson teaches the use of electroluminescent sign panels arranged in sealed, transparent polymeric envelopes to provide a moisture barrier. Alternatively, Dickson teaches employing phosphors encapsulated in a moisture barrier film of tin oxide or equivalent material.

Typically, instruments for military, commercial and private aircraft are conventionally lighted by means of one or more low-voltage incandescent lamps, such as disclosed in the above-listed U.S. Pat. Nos. 2,140,972; 2,259,910; and 3,068,833. Those prior art patents suggest various means for improving the uniformity of the illumination provided by the incandescent lamps, such as annular light-conducting elements and the like. However, failure of an incandescent lamp can occur at any time and result in either non-uniform lighting of the instrument or complete loss of lighting.

Most instruments for the present day high performance military aircraft are designed as sealed modular units which are illuminated by several incandescent lamps disposed internally of the unit. If even a single lamp fails, the entire instrument is normally replaced and the instrument with the failed lamp or lamps is returned to the manufacturer for lamp replacement. Such a procedure is expensive and unnecessarily time consuming.

SUMMARY AND OBJECTS OF THE INVENTION

In view of the foregoing limitations and shortcomings of the prior art instrument illuminating arrangements, as well as other disadvantages not specifically mentioned above, it should be apparent that there still exists a need in the art for an illumination device for aircraft instruments which provides effective and uniform illumination of the instrument and which is inexpensive and readily replaceable.

It is, therefore, a primary objective of this invention to fulfill this need by providing a novel electroluminescent (EL) lamp assembly or EL ring lamp comprising an arcuate or annular electroluminescent lamp fitted in an adapter ring and mounted in external, confronting relation with the glass cover of a sealed aircraft instrument.

As used herein, the term "electroluminescence" means the emission of light, not due to heating effects alone, resulting from application of an electric field to a material. The term electroluminescent lamp means a surface area light source employing the principle of electroluminescence and comprising a suitable phosphor placed between electrodes, at least one of which is essentially transparent and a source of alternating current applied between the electrodes.

More particularly, it is an object of this invention to provide an annular electroluminescent lamp assembly wherein the electroluminescent phosphor particles are encapsulated in a transparent, synthetic polymeric material to render the lamp water- and moisture-proof and thereby permit mounting of the EL lamp in non-sealed relation externally of the transparent glass or plastic cover of a sealed aircraft instrument.

It is another object of this invention to provide an electroluminescent lamp assembly for aircraft instruments which is remarkably simple and economical to manufacture and install and which can be readily replaced without the need to remove or replace the aircraft instrument itself.

Yet another object of the present invention is to provide a moisture-impervious electroluminescent aircraft instrument lamp which is of minimum possible thickness to avoid vision "tunneling effects" when the instrument is viewed by the aircraft piloting crew.

Briefly described, the aforementioned objects are accomplished according to the invention by providing an electroluminescent lamp assembly comprising an annular EL ring lamp formed with electroluminescent phosphor particles encapsulated in a transparent, water- and moisture-proof polymeric material, such as polyurethane, polystyrene or the like. The thus-encapsulated particles are then mixed with a transparent polymeric binder resin, which may be the same material as the encapsulating polymer, and applied by any conventional and well-known application technique, such as silk-screening, to one electrode of the EL lamp. Optimum electroluminescence results can be obtained when the average phosphor particle size is approximately 20 microns in diameter and the thickness of the encapsulating polymeric material does not exceed 0.5 micron. Maintaining the thickness of the encapsulating coating very thin permits a greater particle density, improves the effect of the electric field applied to the lamp and thus results in optimum light output of the EL lamp.

Capsulated Systems, Inc. of Yellow Springs, Ohio, produces encapsulated electroluminescent phosphor particles which are suitable for use in fabricating the EL ring lamp of the present invention. U.S. Pat. Nos. 3,922,373 and 4,107,071 issued to Bayless and assigned to Capsulated Systems, Inc. describe typical microencapsulation processes.

The EL lamp of the invention has a split-ring or split-washer construction preferably of about 330° arcuate extent for use with cylindrical instruments having circular faces or dials. The two electrical leads for the lamp extend one from each free end of the split-ring EL lamp and are routed toward the rear of the instrument mounting panel for connection to a conventional onboard power supply. The radial width of the split-ring is preferably about 0.25 inches; however, the width is not critical and may be of somewhat greater or lesser radial extent depending on the diameter of the instrument and the particular feature or area of the instrument face to be illuminated.

In an alternative embodiment of the invention, the EL ring lamp is formed with a generally frusto-conical illuminating surface disposed at an inclination of approximately 30° to the instrument cover glass. According to this embodiment, the light emitted by the EL lamp is directed somewhat inwardly toward the center of the instrument to thereby enhance the illumination of instrument components and indicia positioned at that location, such as pointers and the like.

With the foregoing and other objects, advantages and features of the invention that may become hereinafter apparent, the nature of the invention may be more clearly understood by reference to the following detailed description of the invention, the appended claims and to the several views illustrated in the attached drawings, wherein:

BRIEF DESCRIPTION OF THE DRAWINGS

FIG. 1 is a perspective view of a panel-mounted aircraft instrument illustrating the mounting of the EL ring lamp of the present invention;

FIG. 2 is a fragmentary cross-sectional view of a first embodiment of the invention taken along line A—A of FIG. 1;

FIG. 3 is a cross-sectional view of the aircraft instrument taken along line B—B of FIG. 1 illustrating a rear view of the EL ring lamp of the invention; and FIG. 4 is a fragmentary cross-sectional view of a second embodiment of the invention also taken along line A—A of FIG. 1.

DETAILED DESCRIPTION OF A PREFERRED EMBODIMENT

Referring now in detail to the drawings, there is illustrated in FIG. 1 an aircraft instrument designated generally by reference numeral 10. According to the preferred embodiment of the invention, the aircraft instrument is intended for use in military aircraft, although the principles of the invention are equally applicable to instruments used in private and commercial aircraft. Instruments for such military aircraft are generally required to be hermetically sealed to preclude the possibility of moisture entering the instrument by reason of the "breathing" or "aspirating" effect when, for example, the aircraft descends from a low pressure at high altitude to a higher pressure at low altitudes. If the instrument is not sealed, moisture-laden air will be sucked or aspirated into the instrument interior thereby increasing the risk of corrosion, short circuits and the like.

The instrument 10 is rear-mounted to a panel 12 in an aircraft cockpit by means of three screws 14. Screws 14 pass through bores 13 (FIG. 3) in radial tabs 15 of an annular adapter plate or ring 16, thence through holes in the panel 12 and into threaded bores of bosses 18 extending radially from the outer cylindrical casing 20 of the aircraft instrument. The forward end of the instrument 10 extends through a circular opening in the panel 12 and is sealed by a circular transparent glass cover 22 through which an instrument dial 24 and pointer 26 (FIG. 2) are viewed by the aircraft pilot, co-pilot or other crew member.

Referring now to FIGS. 2 and 3 which illustrate the details of the EL ring lamp assembly of the present invention, the annular adapter ring 16 which serves as part of the mounting means for the instrument 10, also supports an EL ring lamp 28 in an annular recess or groove 30 formed on the rear or instrument-confronting side of the adapter ring 16. The ring lamp 28 is configured as a split-ring or -washer of approximately 330° arcuate extent and has a radial width of about 0.25 inches.

The illuminating surface area of the EL ring lamp 28 is fabricated with phosphor particles of approximately 20 microns in diameter, each encapsulated in a film of water- and moisture-impervious, transparent polymeric material, such as polyurethane, of about 0.5 micron thickness or less. The encapsulated particles are dispersed in a polymeric binder resin, which may be the same transparent polymer as the encapsulating material, and applied by any appropriate conventional technique to the rearwardly facing side of the ring lamp 28 in overlying relation to an electrode (not shown). A substantially transparent electrically conductive film electrode (not shown) is then affixed over the electroluminescent layer of the ring lamp in a conventional manner and electrical leads 32, 34 are connected to the respective electrodes.

For energizing the EL ring lamp, the electrical leads 32, 34 are connected to a 115 volts AC, 400 Hertz power supply which is a standard power source in all military aircraft. Although phosphors containing copper are preferred for their emission of a soft green light, other phosphors may be utilized for emitting light of a wide variety of colors.

As shown in FIGS. 2 and 3, the leads 32, 34 are routed radially outwardly in a blind recess 36 on the rear side of a tab 38 of the adapter ring 16 and thence through a threaded bore 40 in the instrument boss 18, which bore is not provided with a bolt 14.

Referring now to FIG. 4 wherein there is illustrated a second embodiment of the invention, EL ring lamp 28' is also formed as a split-washer or split-ring but with a generally frusto-conical illuminating surface disposed at an inclination of approximately 30° to the instrument cover glass 22. The adapter ring 16' is of almost identical construction to adapter ring 16 of FIGS. 1–3, except that the thickness thereof is somewhat greater to accommodate the annular conical recess or groove 30' for receiving EL ring lamp 28'. The remaining components illustrated in FIG. 4 correspond to those of FIGS. 1–3 designated with like reference numerals and are thus not described in greater detail. One advantage of the FIG. 4 embodiment of the invention is that the light emitted by the lamp 28' is directed more toward the center of the dial 24 of the instrument 10 to thereby improve the illumination of the pointer 26 or other feature(s) of the instrument that may be positioned at that location.

It will be apparent from the foregoing description that because the EL ring lamp of the present invention is neither sealed to nor formed integrally with the instrument, it may be readily replaced in the event of failure without the need to replace the entire aircraft instrument or to destroy the integrity of the instrument seal.

Although only preferred embodiments of the invention are specifically illustrated and described herein, it will be appreciated that many modifications and variations of the present invention are possible in light of the above teachings and within the purview of the appended claims without departing from the spirit and intended scope of the invention.

What I claim is:

1. In an aircraft indicating instrument having means for displaying information to be viewed externally of the instrument through a substantially planar transparent cover having a peripheral edge and inner and outer surfaces, said cover being arranged in front of the displaying means and means mounted to said instrument for illuminating said displaying means, the improvement wherein said illuminating means comprises an electroluminescent lamp arranged externally of said instrument, means for removably mounting said electroluminescent lamp in non-sealed, confronting relation with the outer surface of said transparent cover and means connected to said electroluminescent lamp for supplying an electric field thereto, said removable mounting means comprising an adapter element surrounding and in overlapping relation with the peripheral edge of the planar transparent cover, said adapter element having a recess on the side thereof confronting the peripheral edge of the planar transparent cover, said electroluminescent lamp being disposed in said recess such that, upon supply of an electric field to said electroluminescent lamp, said lamp directly illuminates the information displaying means of said instrument.

2. The improvement according to claim 1, wherein said electroluminescent lamp comprises an illuminating surface and a layer of electroluminescent material disposed on said surface, said electroluminescent material comprising electroluminescent phosphor particles encapsulated in a substantially transparent polymeric film.

3. The improvement according to claim 2, wherein the average diameter of said phosphor particles is about 20 microns and wherein the thickness of said encapsulating film is about 0.5 micron.

4. The improvement according to claim 1, wherein said instrument comprises a casing having a plurality of bosses arranged thereabout, said bosses having threaded bores therethrough, said adapter element comprising an annular ring having a plurality of radial tabs extending outwardly therefrom, at least some of said tabs being provided with through holes in registration with corresponding threaded bores in said bosses and fastener means extending through said holes into said threaded bores for fastening said adapter element to said instrument casing.

5. The improvement according to claim 4, wherein said electroluminescent lamp comprises a split annular ring and has an arcuate extent of about 330° and a radial width of about 0.25 inches.

6. The improvement according to claim 1, wherein the illuminating surface of said electroluminescent lamp is arranged at an inclination with respect to the planar transparent cover of the instrument.

7. The improvement according to claim 6, wherein said illuminating surface of said electroluminescent lamp defines at least a portion of a frusto-conical surface.

8. The improvement according to claim 6, wherein said illuminating surface is arranged at an angle of about 30° in relation to the planar transparent cover.

9. The improvement according to claim 1, wherein said transparent cover is sealingly mounted to said indicating instrument to prevent penetration of moisture into the instrument.

* * * * *